(No Model.)

C. VOTTI.

ESCAPEMENT WHEEL.

No. 291,432. Patented Jan. 1, 1884.

WITNESSES:
William Miller
Otto Hufeland

INVENTOR
Carl Votti
BY Van Santvoord & Hauff
his ATTORNEYS

United States Patent Office.

CARL VOTTI, OF PHILADELPHIA, PENNSYLVANIA.

ESCAPEMENT-WHEEL.

SPECIFICATION forming part of Letters Patent No. 291,452, dated January 1, 1884.

Application filed August 4, 1883. (No model.)

*To all whom it may concern:*

Be it known that I, CARL VOTTI, a citizen of the United States, residing at Philadelphia, in the county of Philadelphia and State of Pennsylvania, have invented new and useful Improvements in Escapement-Wheels, of which the following is a specification.

This invention relates to improvements in time-pieces, and has for its objects to cheapen and improve the construction of the escapement-wheel, to prevent the teeth becoming loose, and to provide for the flukes of the anchor easily gliding out of and into contact with the teeth of the wheel, thus insuring a smooth-working mechanism.

The objects of my invention are accomplished in the manner and by the means hereinafter described and claimed, and illustrated in the accompanying drawings, in which—

Figure 1:
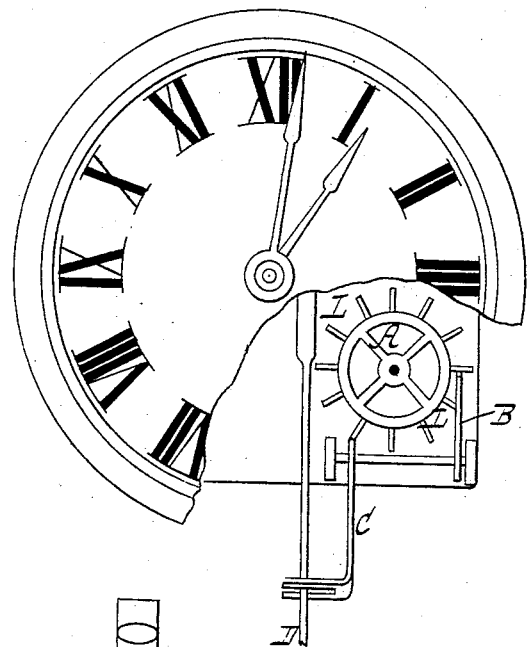
Figure 2:
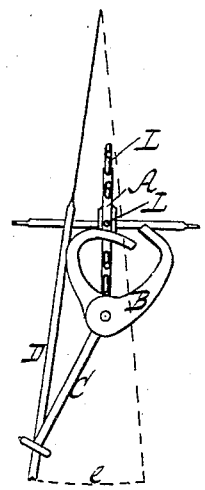
Figure 3:
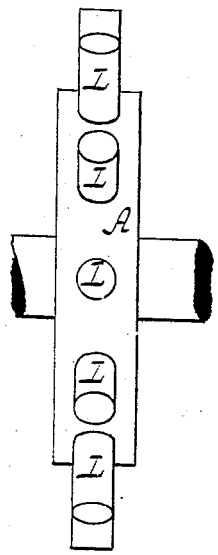

Figure 1 shows a side view of the scape-wheel in connection with the anchor-movement. Fig. 2 shows a front view of the same. Fig. 3 shows a front view of the scape-wheel on a larger scale.

Similar letters indicate corresponding parts.

In the drawings, the letter A indicates the scape-wheel, having teeth L. B indicates the anchor; C, the fork; and D, the pendulum-rod broken off, and e the arc of vibration of the pendulum.

Figure 4:
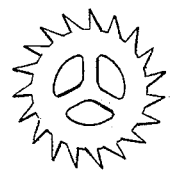

The scape-wheel A is constructed by cutting or punching out a disk of metal so as to have teeth L, and then rounding off said teeth. In scape-wheels heretofore in use the teeth were cut with dissimilar sides—as, for example, in Fig. 4—which operation requires time and skill, while in the case of my invention, where the teeth are rounded off or cylindrical, the manufacture can progress more rapidly and cheaply than when the teeth are formed with dissimilar sides.

I am aware that pin-shaped or rounded teeth have been in use heretofore in scape-wheels, and hence I do not broadly claim such teeth; but such teeth have been severally inserted into the side of the scape-wheel. This manner of construction requires a great deal of labor, and is therefore costly. By my construction the wheel and teeth are both of one and the same piece, the teeth are not liable to work loose, and the manufacture of the wheel can be accomplished cheaply and rapidly, while the wheel, when complete, is durable.

As shown in the drawings, the pendulum vibrates in the direction of the spindle of the scape-wheel, and the rounded form of the teeth allows the flukes of the anchor to glide easily out of and into contact with the teeth, thus insuring a smooth working of the mechanism.

What I claim as new, and desire to secure by Letters Patent, is—

1. The escapement-wheel for time-pieces, composed wholly of metal and formed integral with the cylindrical teeth L, substantially as described.

2. In a time-piece, the combination, with the pendulum and the anchor having flukes, of the escapement-wheel A, cut or stamped from sheet metal and formed integral with the cylindrical teeth L, whereby the flukes of the anchor glide easily out of and into contact with the teeth, and the latter are prevented from becoming loose, substantially as described.

In testimony whereof I have hereunto set my hand and seal in the presence of two subscribing witnesses.

CARL VOTTI. [L. S.]

Witnesses:
 FREDK. BREITINGER,
 C. A. OBERLEIN.